W. A. STREETER, DEC'D.
O. C. STREETER, ADMINISTRATOR.
ANIMAL HANDLING TOOL.
APPLICATION FILED DEC. 31, 1910. RENEWED DEC. 21, 1911.
1,019,727.
Patented Mar. 5, 1912.
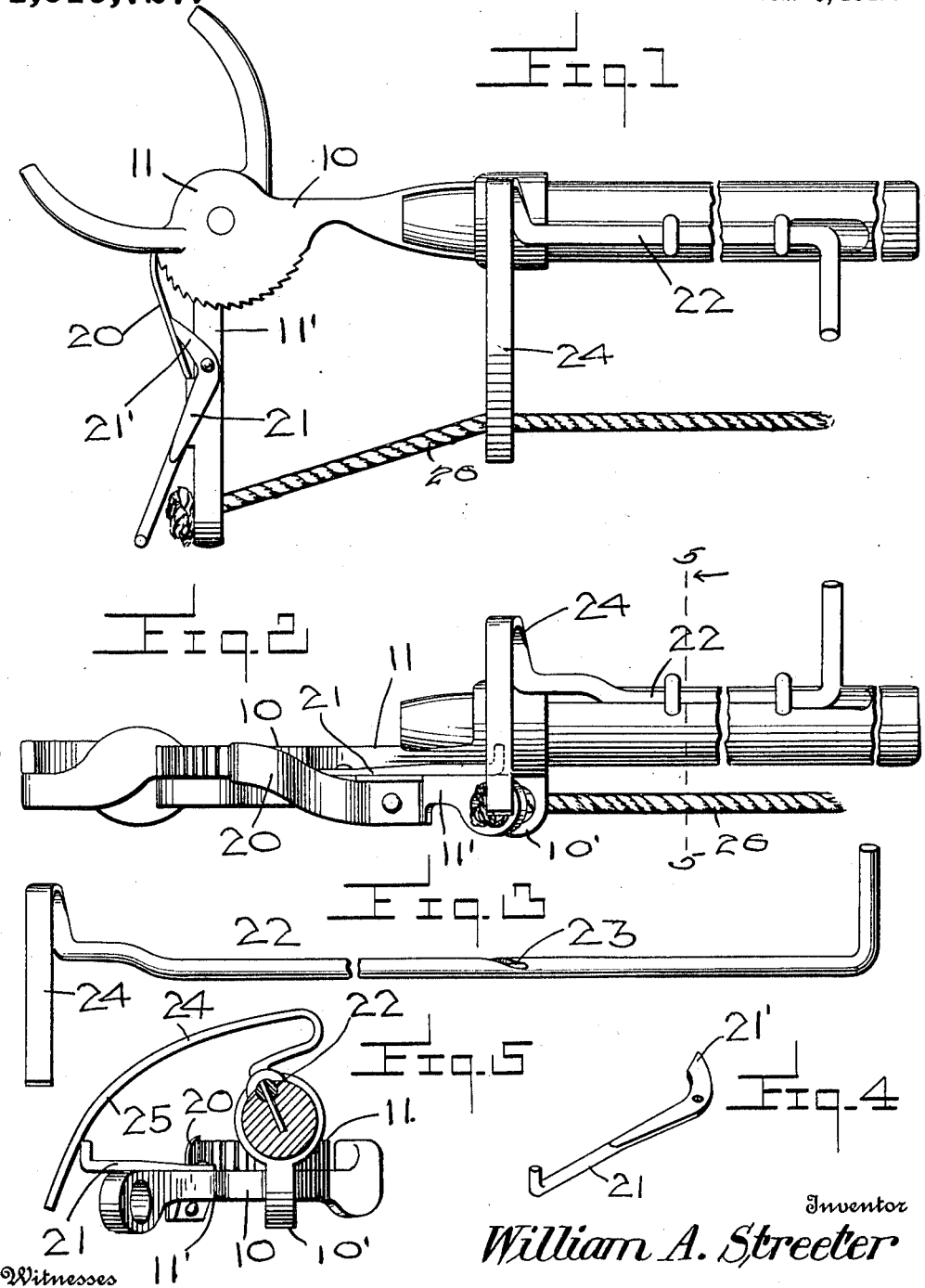

UNITED STATES PATENT OFFICE.

WILLIAM A. STREETER, OF CONCORD, ILLINOIS; OSCAR C. STREETER ADMINISTRATOR OF SAID WILLIAM A. STREETER, DECEASED.

ANIMAL-HANDLING TOOL.

1,019,727. Specification of Letters Patent. Patented Mar. 5, 1912.

Application filed December 31, 1910, Serial No. 600,340. Renewed December 21, 1911. Serial No. 667,210.

*To all whom it may concern:*

Be it known that I, WILLIAM A. STREETER, a citizen of the United States, residing at Concord, in the county of Morgan and State of Illinois, have invented certain new and useful Improvements in Animal-Handling Tools, of which the following is a specification.

This invention relates to animal handling devices, the object of said invention being to provide an attachment for the device illustrated in my application for patent, filed July 1, 1910, Ser. #570009, which will conveniently release the locking spring.

Other objects and advantages will be apparent from the following description, and it will be understood that changes in the specific structure shown and described may be made within the scope of the claim without departing from the spirit of the invention.

In the drawings: Figure 1 is a side elevation of the device, the tool being in its open position, Fig. 2 an edge view showing the releasing members in engagement, Fig. 3 a detail view of the sliding releasing rod, and Fig. 4 a detail view of the latch member. Fig. 5 is a section on the line 5—5 of Fig. 2 in the direction of the arrow.

In the drawings, 10 designates the tool which consists of the pivoted jaws 11 and 11′, one of which is provided with a rack which is engaged by a spring 20 carried by the other jaw member. A pivoted releasing member 21 is arranged on the jaw member 11′, its contacting off-set portion 21′ being so positioned as to lie adjacent the spring 20, said shank being adapted to extend beyond said jaw. It will be seen that by swinging the end portion of said shank, the off-set 21′ will engage said spring, disengaging the same from the teeth carried by the jaw. In order to engage this shank to release the same, an operating rod 22 is provided, said rod lying in a groove formed in the handle and being adapted to reciprocate within a suitable channel, an off set portion being arranged near its end to move the same on the handle. A spiral slot 23 is formed in said rod near its end portion, said slot being adapted to receive a projection carried by the handle, thus forcing the rod to rotate as the same is reciprocated. Said rod terminates in a curved off-set 24 which is provided with a cam surface 25, which travels in a curved path as the rod is reciprocated. Secured to the jaw member 11′ is a rope 26 which passes through the member 10′ and by means of which the member 11′ is moved to close the jaws.

It will be seen that with the jaws in their locked position, the curved off-set 24 will lie directly above the end portion of the shank 22, and when the rod is reciprocated, said shank will be engaged by the cam face of said off-set, thus swinging the latch on its pivot and releasing the spring in such a manner that the jaws may be forced apart, the cam surface being adapted to take up the distance between the latch member and the handle said latch member swinging on its pivot to release itself from the off-set when the jaws have been forced open, the animal forcing the jaws apart as soon as the spring is brought out of contact with the jaw member.

The many advantages of a device of this sort will be clearly apparent, as it will be unnecessary for the operator to come in close contact with the animal to release the jaws.

What is claimed is:

An animal catching tool consisting of pivoted jaw members, one of said members being provided with a rack adapted to be engaged by a spring carried by the other member, a handle secured to one of said jaw members, a latch member pivotally supported by the spring carrying jaw member, said latch being provided with an outwardly extending portion adapted to contact with said spring, a rod arranged to reciprocate on said handle, said rod being provided with a spiral groove, a projection carried by said handle adapted to enter said groove, the end portion of said rod terminating in a curved off-set, said off-set being provided with a cam surface which is arranged to engage said latch member to release said spring as said rod is reciprocated.

In testimony whereof I affix my signature, in the presence of two witnesses.

WILLIAM A. STREETER.

Witnesses:
SAMUEL N. BLIMLING,
ARCH. W. MCCONNELL.

---

Copies of this patent may be obtained for five cents each, by addressing the "Commissioner of Patents, Washington, D. C."